United States Patent
Siano et al.

(10) Patent No.: US 6,251,326 B1
(45) Date of Patent: *Jun. 26, 2001

(54) PROCESS AND APPARATUS FOR COINJECTION MOLDING OF ARTICLES HAVING COMPLEX SHAPE

(75) Inventors: Dante Siano, Cologno Monzese; Luigi Vecchiarino, Vaprio d'Adda, both of (IT)

(73) Assignee: Commer, S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/669,462

(22) PCT Filed: Dec. 22, 1993

(86) PCT No.: PCT/IT93/00135

§ 371 Date: Jun. 20, 1996

§ 102(e) Date: Jun. 20, 1996

(87) PCT Pub. No.: WO95/17291

PCT Pub. Date: Jun. 29, 1995

(51) Int. Cl.$^7$ ............................. B29C 45/03; B29C 45/16
(52) U.S. Cl. ............................. 264/328.8; 264/328.12; 264/328.14; 425/542; 428/31; 364/475.08
(58) Field of Search ........................ 428/31; 264/328.1, 264/328.8, 328.12, 328.14, 40.1; 364/475.08, 475.07; 425/542

(56) References Cited

U.S. PATENT DOCUMENTS

| | | | |
|---|---|---|---|
| 4,619,847 | * | 10/1986 | Jackson .................................. 428/31 |
| 4,670,199 | * | 6/1987 | Montet et al. ..................... 264/328.8 |
| 4,743,322 | * | 5/1988 | Holroyd et al. ....................... 156/123 |
| 4,923,666 | * | 5/1990 | Yamazaki et al. .......... 264/328.13 X |
| 4,989,166 | * | 1/1991 | Akasaka et al. .................. 264/476 X |
| 5,031,127 | * | 7/1991 | Fujita et al. .......................... 364/476 |
| 5,045,268 | * | 9/1991 | Sorensen ..................... 264/328.12 X |
| 5,069,840 | * | 12/1991 | Arnott .......................... 264/328.12 X |
| 5,162,092 | * | 11/1992 | Klobucar et al. ............. 264/328.8 X |
| 5,167,896 | * | 12/1992 | Hirota et al. .................. 264/328.8 X |
| 5,223,191 | * | 6/1993 | Tatsuno et al. ..................... 264/40.1 |
| 5,746,952 | * | 5/1998 | Marshall ............................. 264/40.1 |

FOREIGN PATENT DOCUMENTS

| | | |
|---|---|---|
| 0473944 | 3/1982 | (EP) . |
| 0399174 | 11/1990 | (EP) . |
| 0579925 | 1/1994 | (EP) . |
| 1369744 | 10/1974 | (GB) . |
| 51-109952 | 9/1976 | (JP) . |
| 02108511 | 4/1990 | (JP) . |

OTHER PUBLICATIONS

"Sandwich moulding—a way to cut car costs?", Engineering, vol. 225, No. 9, Sep. 1985, London GB p. 483.

* cited by examiner

Primary Examiner—Francis J. Lorin
(74) Attorney, Agent, or Firm—Lerner, David, Littenberg, Krumholz & Mentlik, LLP

(57) ABSTRACT

An article having complex geometrical shape is obtained by consecutively coinjection molding a first and a second material substantially without stopping time between the two injections. Pressure, temperature and mass flow rate are controlled to obtain a homogeneous distribution of the several flows of injected material and to have them meet in a fluid condition and melt together at the meeting point.

23 Claims, 3 Drawing Sheets

PROCESS AND APPARATUS FOR COINJECTION MOLDING OF ARTICLES HAVING COMPLEX SHAPE

FIELD OF THE INVENTION

The present invention relates to a process and an apparatus for manufacturing multilayer molded articles by co-injection molding of two or more different materials to have a final sandwich structure.

BACKGROUND OF THE INVENTION

Many types of processes are known for the manufacture of sandwich molded articles. Generally, said processes enable one to produce only articles having a very simple shape, such as parisons for blow-molded bottles, as disclosed in EP-A-0325440. According to this document, in order to obtain a sandwich parison having an inner layer of PET, an intermediate layer of EV-OH and an external layer of PET, a coaxial injection nozzle is used, and the PET resin is injected before and after injection of the EV-OH resin. A stopping time between first and second injections is provided, while second and third injections are carried out in part simultaneously. The resins, paths are thermally insulated in order to maintain the required different temperatures as far as possible.

U.S. Pat. No. 5,167,896 (Hirota) discloses the coinjection of a resin surface material and a core of fiber-reinforced resin mixture to manufacture a cabinet for use with a display.

Only a portion of the obtained cabinet has a sandwich structure with inner core and two external layers. In fact, coinjection is not an easy process and it becomes even more difficult to control where the required molded article has a geometrically complex shape.

EP-A-93108241.6 discloses an apparatus for coinjection molding provided with several nozzles for one cavity of the mold.

OBJECTS OF THE INVENTION

The object of the present invention is to provide a process and an apparatus for co-injection moulding of sandwich articles having a complex shape.

SUMMARY OF THE INVENTION

Said object is obtained by means of the present invention that relates to a process of preparing a multilayer injection molded article having a sandwich structure according to claim 1.

The invention also relates to an apparatus to carry out the above process, according to claim 9.

The invention further relates to the articles obtained by means of the claimed process, and namely to trim panels for autovehicles, characterized according to claim 20.

According to a preferred embodiment, the mold temperature is controlled to maintain the injected materials in a fluid condition such as to provide along their flow paths optimal temperatures and pressures until the flows of materials meet inside the mold cavity and form a single piece article.

According to another aspect of the invention, two or more injection nozzles are used to simultaneously inject in several points of the cavity said first, second and optionally said further materials.

The advantages of the present invention will be evident to the skilled technician, when considering that it is the first time that complexly shaped articles with a sandwich structure are obtained by coinjection.

The invention will be now described in a more detailed way with reference to the accompanying drawings given by illustrative and non limiting purposes, where:

DESCRIPTION OF THE PREFERRED EMBODIMENTS

The term "coinjection", as here used, refers to an injection molding process wherein two or more different materials are injected into the same mold cavity to obtain a multilayer product having a sandwich structure. The process according to the present invention may be applied to the production of any kind of article that cannot be obtained by ordinary coinjection methods known in the art.

Figure 5:
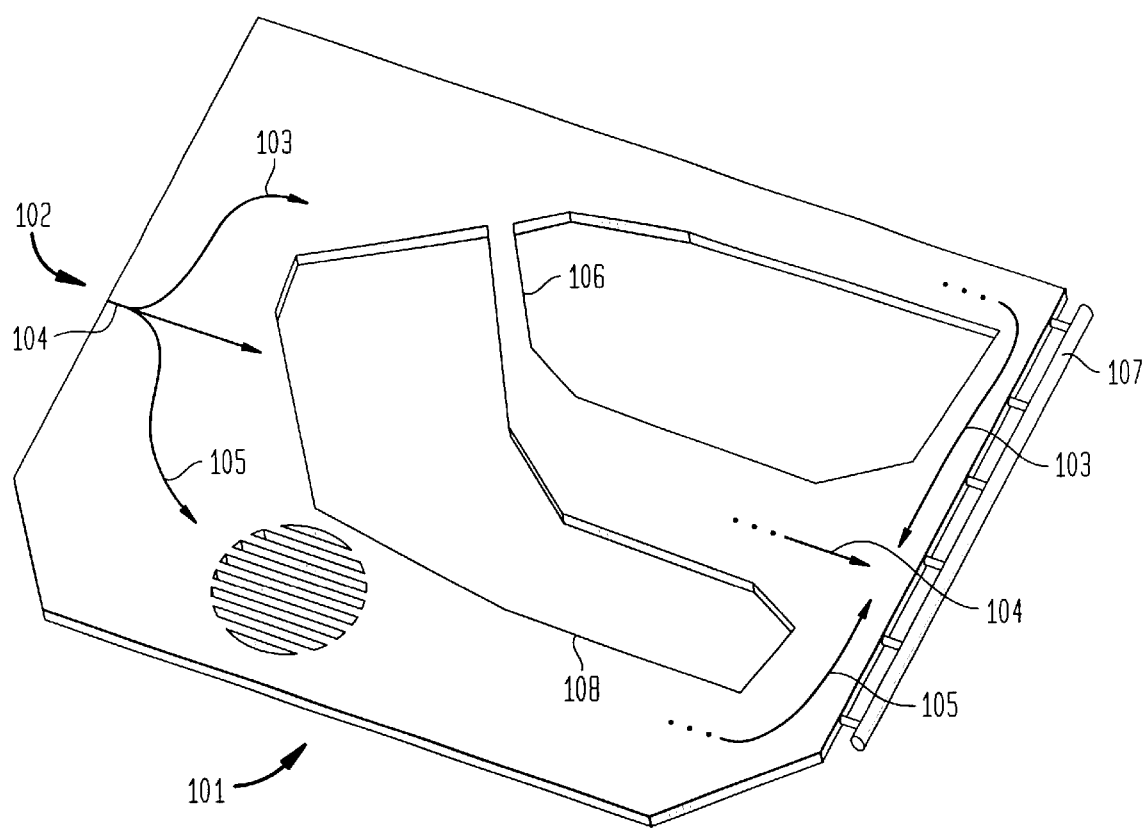
FIG. 5 is a schematic view of the flow paths during molding of an article according to the process of the present invention.

An example of such an article is shown in FIG. 5, where a portion of a trim panel for autovehicles is depicted. To this base portion, that is one piece with handle, pocket and the grill for stereo speakers, complementary portions are subsequently fixed. These portions are obtained from different materials according to processes known in the art.

From this drawing is apparent the complexity of the product shape and the inventive step of the present invention will therefore be appreciated.

In the following description, the process will be disclosed with reference to this product, but it is obvious that it is not limited to it, and that any kind of article may be obtained, such as for household goods, furniture items and similar articles.

According to the invention process, in order to coinjection mold the required article and to obtain a final product having a sandwich structure, the shape of the article is first analysed and the position of the injection nozzle or nozzles is determined in view of the possible flow paths of injected materials that result from the possible different positions of the injection nozzle(s). Most prefereably, the paths of the flows are such as to have a final meeting point of the flows located in a scarcely visible position of the panel.

More specifically, the position of the said nozzle(s) is such that it results in a plurality of flows of injected materials, within the mold cavity, where each flow is balanced with respect to the other flows. This means that the injection point is selected to have flows provided with substantially the same speed of travel (or penetration in the cavity) of the injected materials along the relevant paths until they meet in the selected meeting point. This location of the injection point (or points), and therefore the choice of the flow paths, is selected assuming that there is a constant hydraulic resistance in all points of the cavity.

The next step is therefore to check such assumption and to optimize the thickness pattern of the cavity, i.e. to prepare the cavity of the mold in order to have substantially the same hydraulic resistances along corresponding portions of the flow paths of injected materials.

This is obtained by planning the dimensions of the cavity so as to obtain the required values of hydraulic resistances to penetration of the injected materials.

The next step is to select the materials to be used. In the case of a trim panel, it was found that the preferred materials are polypropylene for the outer skin and filled polypropylene for the inner core material. Examples of products that may be used are products such as EXP 1761 for the internal portion and HIFAX CA60A for the external one, both produced by HIMONT.

Once the materials are selected, their behaviour, i.e. rheology and similar characteristics, at different temperatures and pressures is considered. This behaviour is available in the literature, and the relevant data are memorized in a computer.

These data are subsequently used to select the best pressure, flow rate and temperature for carrying out the injection of each material. Namely, the injection conditions (i.e. P, T and flow rate) are selected to have the injected materials in a fluid condition as long as possible, in order to obtain a substantially even distribution of the injected materials along the flow paths and throughout the mold cavity.

It is important that the different flows of injected materials meet each other in the final portion of the flow paths, in a fluid condition, i.e. at such temperature and pressures that they melt together and obtain a single product without faults, cavities or visible seam lines, while maintaining a sandwich-like structure.

once all the injection conditions have been set, the first material, i.e. that forms the outer skin material, is injected. The amount of first material that is injected is selected according to the required amount in view of the dimensions of the final product, and usually is from 20 to 50%, by volume, of the injected materials.

Immediately after all the first material is injected, the injection of the second material is started. It is important to avoid or at least to limit as far as possible any delay time between injection of first and second material.

To this purpose, in a preferred embodiment of the invention, there is provided a reduced time during which the first and the second material are fed together from the nozzle.

If more than two materials are to be injected, the above operation is repeated for any further material.

The injection of the last injected material is continued under increasing pressure until all the cavity is filled by the injected materials and the different flows have met and melted together. When two materials are injected, e.g. a PP outer skin and a core material of PP filled with vegetal fibers, the molding conditions of the two materials are controlled to avoid aesthetic defects of the outer, skin material. This is obtained by controlling, besides other parameters, the flow rate of the second injected material.

In order to avoid having the first injected material cool too quickly and thus lose its plastic and fluid condition, the invention process provides means to locally heat the mold to keep fluid the injected materials during the injection process. The heating temperature is usually increased with the increase of the distance from the injection point.

According to another feature of the invention, the mold also comprises cooling means for locally cooling selected areas of the cavity where the molded product has greater cross section and would therefore take longer time to cool enough to be extracted from the mold. Both cooling and heating means for the mold are known per se in the art and are not shown in the drawings.

As previously mentioned, there may be one or more injection points, i.e. injection nozzles, for a single cavity.

In FIG. 5, an article is depicted, namely the base portion of a trim panel, that may be obtained according to this invention. In this figure, article 101 has one injection point 102 that is located laterally to the panel. From this point three different flows, 103–105, originate and meet at the other side of the panel, in a fluid state, and melt together to give the required product. Reference number 107 refers to material molded in a supplementary portion of the cavity, that is used, in a way known in the art, to provide a "discharge volume" for the injected outer material, and optionally for the other materials, to make easier the copenetration of the second, and optionally further, materials in correspondence of the meeting points of the flows.

The above process also apply to the production of an article by coinjection through a plurality of nozzles in one cavity. In this case, there is-one or more flow for each nozzle, and several areas where the flows meet in the required fluid condition. The same steps above disclosed will be implemented, the only difference being that several injection points and flows of materials will have to be considered.

During the injection of said materials into the cavity of the mold, a gas may be injected at selected locations of the panel. In the case of the panel of FIG. 5, said gas injection is performed in correspondence to the door handle 106 and the panel pocket wall 108 and, more generally, in all points such as ribs or the like where the injected material is subject to volume variations upon cooling, that may result in shrinkage cavities.

Concerning the device to carry out the above process, FIGS. 1–4 disclose an embodiment suitable for co-injection in several points of a cavity, but it is evident that the same device limited to only one injection point is suitable for carrying out coinjection in a single point of one cavity.

Figure 1:
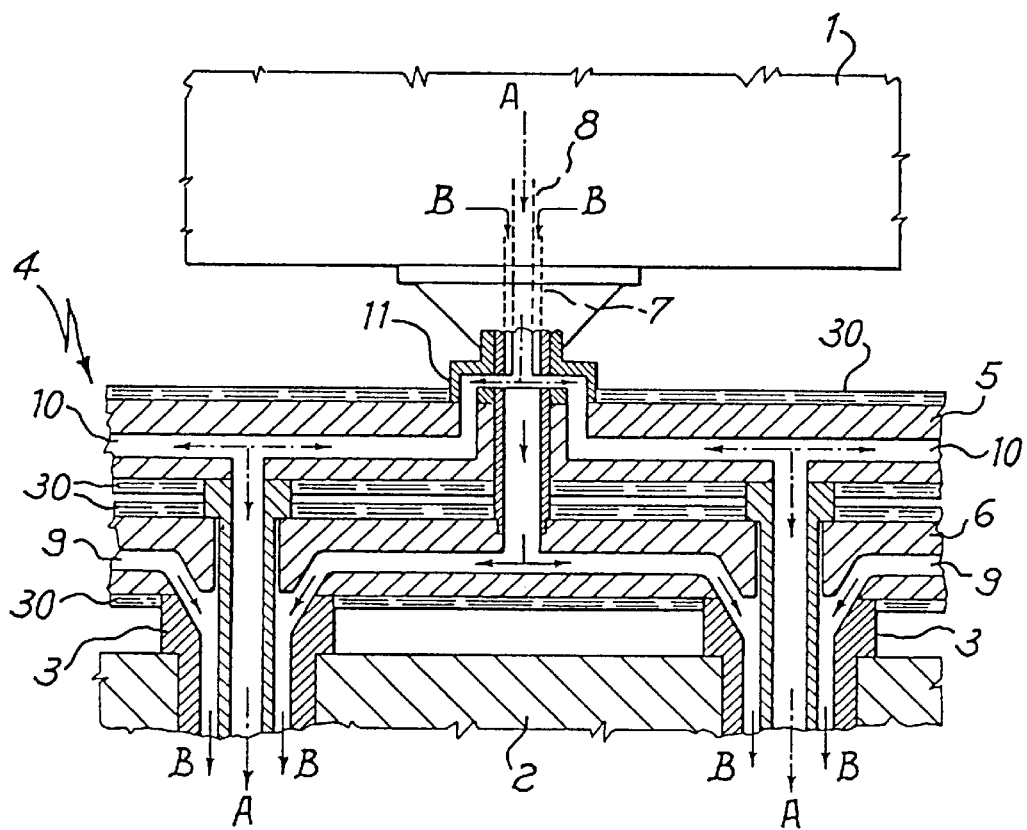
FIGS. 1 and 3 are sectional and partial views of coinjection devices for carrying out the process of the invention.

FIG. 1 shows a device 4 for the coinjection of two materials A and B, which are upstream connected with an injection molding machine 1 or other similar equipment capable of downstream delivering said materials at suitable pressure and temperature to a mold 2 through coinjection units 3.

The device 4 comprises two distinct plates 5 and 6, independently heated by heating means 30 to control their temperature, provided between feeding ducts 7 and 8 for the materials at the fluid state coming from the injection molding machine 1, and ducts 9 and 10 for the distribution of the same materials to a plurality of coinjection units 3 housed in the mold 2.

In the embodiment as shown in FIG. 1, the feeding ducts 7, 8, are coaxial and arranged one inside the other. In correspondence to a fitting 11, the ducts are separated in such a way that each one follows its own path in the relevant plate, in order to allow an independent temperature control of each material.

The heating and the temperature control of the plates is carried out by known means, for instance using resistors 30 and thermocouples (not shown) housed in the plates themselves. Thermal insulation means could be provided to have a better temperature control.

To illustrate more clearly the paths of materials inside the device, the path of material A is indicated by dashed-dotted arrows, while path of material B is indicated by continuous line arrows.

The ratio of surface and core materials is selected in view of their properties and of the required final characteristics of the panel. When two materials are injected, the amount, in volume, of core material is within the range from 40% to 80% of the total volume of injected materials.

In correspondence to the injection points provided on the mold 2, the ducts 9, 10 are again brought to the coaxial arrangement corresponding to that of feeding ducts 7, 8, to allow their connection with the coinjection units 3. Units 3 comprise two coaxial injectors separately operatable to allow the regulation of the mass flow rate of the injected materials.

Figure 2:
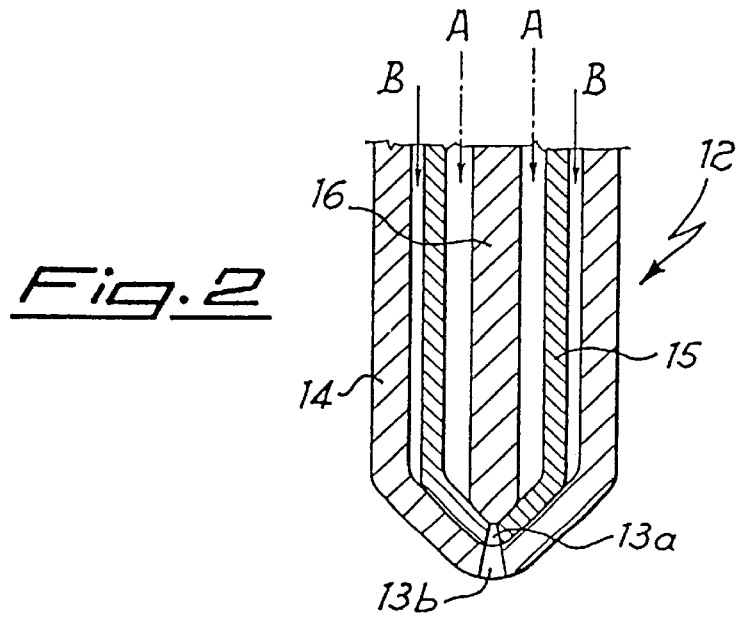
FIGS. 2 and 4 are schematical sectional views of coinjection nozzles.

FIG. 2 schematically shows in cross-section the lower portion of an injector 12, namely the one provided in correspondence to a hollow portion of the mold 2, in the position of non delivery of both materials A and B from the relevant nozzles 13a and 13b.

To perform the delivery of material A, the shutter 16 is lifted with respect to the body 15 of the internal injector, thus freeing the injection port of the nozzle 13a. The delivery of material B, on the contrary, takes place by lifting the body 15 of the internal injector, also acting as a shutter of the injection port of the nozzle 13b, with respect to the body 14 of the external injector. It is moreover possible to obtain a combination of movements allowing a simultaneous delivery of both materials, when injection of first material is nearly ended, in order to avoid any pressure drop in the nozzle and mold.

Figure 3:
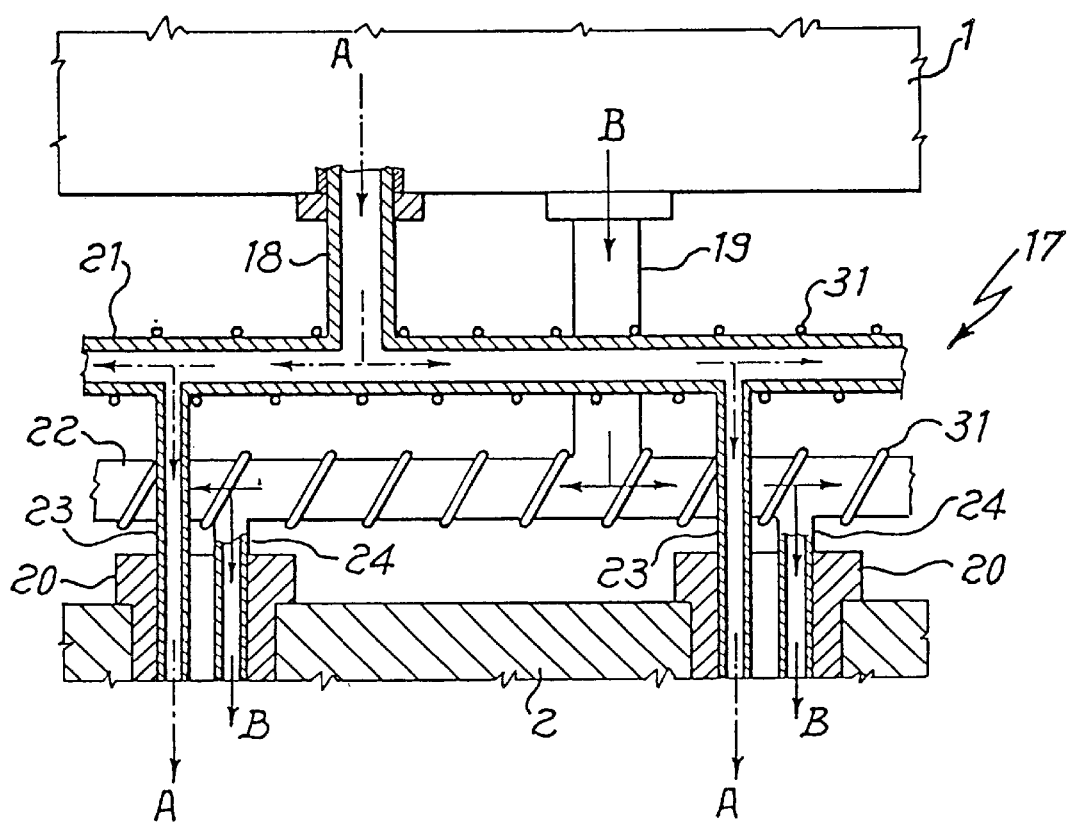

FIG. 3 shows a further embodiment of a device 17 for the coinjection in several injection sites of a mold.

According to the present invention the device 17 is upstream connected to injection moulding machine 1 through two distinct tubular ducts 18 and 19 for feeding materials A and B respectively, while downstream it is connected to a mold in correspondence to a plurality of coinjection units 20.

The device 17 comprises two distinct tubular ducts 21 and 22, independently heated by heating means 31a and 31b that also act as means to control their temperature. Ducts 21 and 22 are connected to feeding ducts 18 and 19 and feed the heated materials at the fluid state coming from injection moulding machine 1 to ducts 23 and 24 for the distribution of the same materials to each of the coinjection units 20 housed in the mold 2.

In this case, too, the tubular ducts 21 and 22 are separated, in order to allow a separate heating and temperature control of the materials that are flowing therein; also the heating and temperature control are performed by known means, for example by using electrical resistors 31a and 31b and thermocouples (not shown) placed directly in contact with the ducts 21 and 22.

From each duct 21 and 22, many ducts are derived, 23 and 24 respectively, that reach the single injection units 20 provided on the mold 2.

The coinjection units 20 provided in the embodiment of FIG. 3 preferably comprise two injectors placed side by side and separately operable, to allow an independent regulation of the mass flow rate of injected materials. It is understood that in this case, too, coaxial injectors can be used, as previously described, envisaging suitable connecting adapters between the ducts 23 and 24 and the coinjection units 20.

Figure 4:
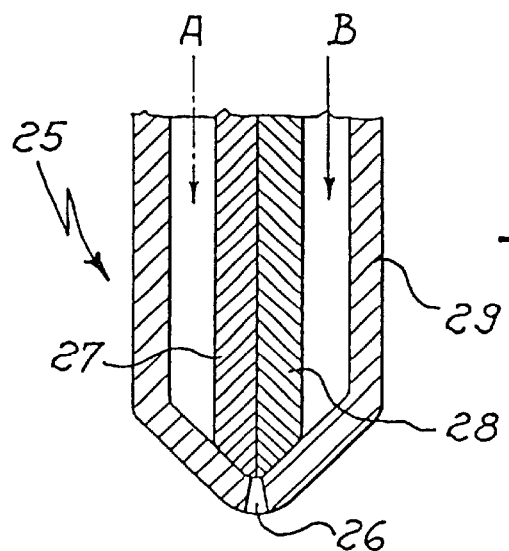

FIG. 4 schematically shows in cross section the lower portion of an injector 25, namely that portion provided in correspondence to a hollow portion of the mold 2, in the condition of non-delivery of both materials A and B from the nozzle 26.

To perform the delivery of material A a shutter 27 is lifted from the injector body 29, thus freeing a portion of the injection port of nozzle 26. The delivery of material B, on the contrary, takes place by lifting a shutter 28 of the corresponding portion of the injection port of nozzle 26 from the injector body 29. It is also possible to carry out a combination of movements that allow the simultaneous delivery of both materials for a very short time above disclosed with reference to the invention process.

Alternatively, the injection unit of FIG. 4 can have two separated nozzles (instead of the nozzle 26 alone) placed side by side and each obstructed by related shutters 27 and 28.

Preferably, the injectors 12 (FIG. 2) and 25 (FIG. 4) comprise means for the heating and the independent temperature control of each flow of material.

According to a further feature of the present invention, the device also comprises means for a localized heating of a plurality of areas of the mold in order to improve a homogeneous distribution of materials to particular areas of the mold or to avoid undesirable cooling in correspondence to conjunction zones between the flows of the materials coming from different injection points. Similary, cooling means (know in the art and comprising e.g. water ducts) can be provided at those mold location such as the handle, where the amount of injected material is such as to require a too long cooling time in standard conditions.

Coinjection may be carried out in only one point or in several points. The above description refers to a mold having multiple nozzles for each cavity, but the same principles and features apply to molds having a single nozzle for one cavity.

This embodiment is preferred with respect to the multiple nozzle one in view of its lower costs resulting from presence of only one nozzle.

The means and the techniques of localized gas injection during the injection of a thermoplastic material are known in the art (see e.g. U.S. Pat. Nos. 5,162,092 and 4,923,666) and per se are not an object of the present invention.

What is claimed is:

1. A process for producing an injection molded multi-layered article from a plurality of injected materials in a mold having a mold cavity, said multi-layered article including at least a pair of outer skin layers and an inner layer, said process comprising analyzing the shape of said article and of said mold cavity, determining the relative flow paths of said plurality of injected materials required to obtain a substantially homogeneous distribution of said plurality of injected materials within said mold cavity, dimensioning said mold cavity based upon said determined relative flow paths in order to provide said mold cavity with a thickness pattern resulting in substantially equal hydraulic resistance along said flow paths of said plurality of injected materials, selecting at least first and second injected materials, selecting injection pressures, flow rates and temperatures for each of said first and second injected materials in order to provide a substantially even distribution of said first and second injected materials throughout said mold cavity, and injecting a predetermined amount of said first injected material at a first selected temperature, pressure and flow rate, and immediately thereafter injecting a predetermined amount of said second injected material at a second selected temperature, pressure and flow rate until said mold cavity is filled and said flows of said injected materials have met and co-penetrated.

2. The process of claim 1 wherein said selecting of said injection pressures, temperatures and flow rates comprises using a computer which has stored such data.

3. The process of claim 1 including injecting a predetermined amount of at least a third injected material at a third selected temperature, pressure and flow rate until said mold cavity is filled.

4. The process of claim 1 including injecting said first and second injected materials into a single cavity of said mold through a plurality of nozzles.

5. The process of claim 1 including locally heating said mold to maintain said plurality of injected materials in a fluid state until said mold cavity is filled and said flows of said first and second injected materials have met and co-penetrated.

6. The process of claim 1 including injecting gas into portions of said mold corresponding to portions of said article which are subject to shrinkage and cooling.

7. The process of claim 1 including locally cooling said mold following said injecting of said first and second injected materials thereinto.

8. The process of claim 7 wherein said locally cooling of said mold is carried out in areas where said article has an increased cross-section.

9. The process of claim 1 wherein said article comprises a trim panel, and wherein said first injected material comprises polypropylene and is injected to provide said outer layers of said article and said second injected material comprises polypropylene including vegetable fiber filler, and is injected to provide said inner layer of said article.

10. Apparatus for producing an injection molded multi-layered article from a plurality of injected materials in a mold having a mold cavity comprising a plurality of independent conduits for said corresponding plurality of injected materials whereby the temperature of each of said plurality of injected materials can be independently controlled and said plurality of injected materials can be maintained in a fluid state, at least one coinjection nozzle connected to each of said plurality of independent conduits for coinjecting each of said plurality of injected materials, said at least one coinjection nozzle disposed in correspondence with at least one point in said mold cavity, whereby a plurality of flow paths are provided for said plurality of injected materials within said mold cavity, said mold cavity being dimensioned so as to provide said plurality of flow paths having substantially the same hydraulic resistance.

11. The apparatus of claim 10 wherein said plurality of independent conduits are provided by means of a plurality of independently temperature controlled plates, and including secondary conduits for feeding said plurality of injected materials to said at least one coinjection nozzle.

12. The apparatus of claim 10 wherein said plurality of independent conduits are provided by means of a plurality of separate independently temperature controlled tubular ducts, and including secondary conduits for feeding said plurality of injected materials to said at least one coinjection nozzle.

13. The apparatus of claim 11 or 12 wherein at least a portion of said secondary conduits are coaxially disposed.

14. The apparatus of claim 10 wherein said at least one coinjection nozzle comprises a plurality of coaxial injectors.

15. The apparatus of claim 11 or 12 wherein at least a portion of said secondary conduits are disposed adjacent to each other in a side-by-side relationship.

16. The apparatus of claim 13 wherein the temperature or flow rate of said at least a portion of said secondary conduits are independently controlled.

17. The apparatus of claim 15 wherein the temperature or flow rate of said at least a portion of said secondary conduits are independently controlled.

18. The apparatus of claim 10 including heating means for locally heating said mold.

19. The apparatus of claim 10 including cooling means for locally cooling said mold.

20. A coinjection molded article produced by the process of claim 1.

21. The coinjection molded article of claim 20 comprising the base portion of a trim panel for a vehicle.

22. A trim panel for a vehicle comprising a base portion according to claim 21 and at least one complementary portion comprising a material different from that of said based portion.

23. The apparatus of claim 10 including means for carrying out localized gas injection.

* * * * *